(12) United States Patent
Khoryaev et al.

(10) Patent No.: US 9,419,830 B2
(45) Date of Patent: Aug. 16, 2016

(54) DEVICE, SYSTEM AND METHOD OF COMMUNICATING A WIRELESS COMMUNICATION ORTHOGONAL-FREQUENCY-DIVISION-MULTIPLEXING SIGNAL

(75) Inventors: Alexey Khoryaev, Dzerzhinsk (RU); Artyom Lomayev, Nizhny Novgorod (RU); Vladimir Kravstov, Jerusalem (IL); Michael Genossar, Modiin (IL)

(73) Assignee: INTEL CORPORATION, Santa Clara, CA (US)

( * ) Notice: Subject to any disclaimer, the term of this patent is extended or adjusted under 35 U.S.C. 154(b) by 0 days.

(21) Appl. No.: 13/976,470

(22) PCT Filed: Mar. 28, 2012

(86) PCT No.: PCT/US2012/030916
§ 371 (c)(1),
(2), (4) Date: Jun. 27, 2013

(87) PCT Pub. No.: WO2013/147764
PCT Pub. Date: Oct. 3, 2013

(65) Prior Publication Data
US 2014/0023155 A1  Jan. 23, 2014

(51) Int. Cl.
*H04L 27/00* (2006.01)
*H04L 25/08* (2006.01)
*H04L 27/26* (2006.01)
*H04L 5/00* (2006.01)
*H04L 25/03* (2006.01)

(52) U.S. Cl.
CPC ............ *H04L 25/08* (2013.01); *H04L 27/2613* (2013.01); *H04L 27/2657* (2013.01); *H04L 27/2685* (2013.01); *H04L 27/2688* (2013.01); *H04L 27/2695* (2013.01); *H04L 5/0048* (2013.01); *H04L 25/03821* (2013.01)

(58) Field of Classification Search
CPC .................................. H04L 25/08; H04L 27/26
USPC .......................................... 375/260, 296, 349
See application file for complete search history.

(56) References Cited

U.S. PATENT DOCUMENTS

| 6,754,170 B1 * | 6/2004 | Ward | H04B 7/0811 370/208 |
|---|---|---|---|
| 2004/0114675 A1 * | 6/2004 | Crawford | H04L 27/2657 375/149 |
| 2004/0171366 A1 * | 9/2004 | Bar-Ness et al. | 455/278.1 |

(Continued)

OTHER PUBLICATIONS

Overview of IEEE P802.16M Technology and Candidate RIT for IMT-AdvancedIEEE 802.16 IMT-Advanced Evaluation Group Coordination Meeting, Jan. 2010.*

(Continued)

*Primary Examiner* — Daniel Washburn
*Assistant Examiner* — Berhanu Tadese
(74) *Attorney, Agent, or Firm* — Shichrur & Co.

(57) ABSTRACT

Some demonstrative embodiments include devices, systems and/or methods of communicating a wireless orthogonal-frequency-division-multiplexing (OFDM) signal. For example, a wireless communication device may communicate a wireless communication OFDM signal including a plurality of data subcarriers carrying data, at least one pilot subcarrier carrying a reference, predefined, value, and a plurality of zero subcarriers, carrying a zero value, surrounding the pilot subcarrier and separating between the pilot subcarrier and the data subcarriers.

30 Claims, 6 Drawing Sheets

(56) References Cited

U.S. PATENT DOCUMENTS

| | | | |
|---|---|---|---|
| 2004/0233838 A1* | 11/2004 | Sudo et al. ............... | 370/208 |
| 2005/0100108 A1* | 5/2005 | Yun ............... H04L 27/2618 | 375/260 |
| 2006/0018251 A1 | 1/2006 | Park et al. | |
| 2006/0018394 A1* | 1/2006 | van Zelst et al. ............ | 375/260 |
| 2006/0176936 A1* | 8/2006 | Wang et al. ............ | 375/146 |
| 2006/0262868 A1 | 11/2006 | Leshem | |
| 2007/0230591 A1* | 10/2007 | Choi ............... H04L 27/2657 | 375/260 |
| 2008/0095226 A1 | 4/2008 | Bar-Ness et al. | |
| 2009/0080551 A1* | 3/2009 | Ma ............... H04L 27/2602 | 375/260 |
| 2009/0190675 A1* | 7/2009 | Ling et al. ............... | 375/260 |
| 2009/0245401 A1* | 10/2009 | Chrabieh ............ H04L 1/0041 | 375/260 |
| 2010/0027698 A1* | 2/2010 | Kim ............... H04L 5/0042 | 375/260 |
| 2010/0061223 A1* | 3/2010 | Kim et al. ............... | 370/208 |
| 2010/0183104 A1* | 7/2010 | Alexander ............ H04L 25/022 | 375/346 |
| 2010/0329374 A1* | 12/2010 | Pi ............... | 375/260 |
| 2011/0003551 A1* | 1/2011 | Kameno ............ H04W 52/325 | 455/62 |
| 2011/0058626 A1 | 3/2011 | Balakrishnan et al. | |
| 2011/0149929 A1* | 6/2011 | Kleider ............ H04L 5/0023 | 370/338 |
| 2011/0255572 A1* | 10/2011 | Giannakis ............ H04L 25/0206 | 375/146 |
| 2013/0022091 A1* | 1/2013 | Muralidhar ............ H04L 25/022 | 375/219 |
| 2013/0034175 A1* | 2/2013 | Kim et al. ............... | 375/260 |
| 2013/0215868 A1* | 8/2013 | Chun et al. ............... | 370/330 |

OTHER PUBLICATIONS

A Systems Approach to Understanding IEEE 802.16M Radio Access Technology_Chapter 9-The IEEE 802.16M Physical Layer (Part I)_Mobile Wimax_2011.*

IEEE STD 802.16M-2011, Standard for Local and Metropolitan Area Networks, Amendment 3-Advanced Air Interface—Part 16, May 2011.*

Promsuwanna et al., A Novel Pilot Scheme for Frequency Offset and Channel Estimation in 2×2 MIMO-OFDM, World Academy of Science, Engineering and Technology, vol. 7 Feb. 2013.*

Zhang et al., "Clustered Pilot Tones for Carrier Frequency Offset Estimation in OFDM Systems," IEEE Transactions on Wireless Communications, vol. 6, No. 1, Jan. 2007.*

International Search Report and Written Opinion for PCT/US2012/030916, mailed on Nov. 28, 2012; 9 pages.

Wireless Gigabit Alliance (WGA) Specifications; WiGig MAC and PHY Specification Version 1.0, Apr. 2010—Final Specification; 311 pages.

IEEE Standard for Information technology—Telecommunications and information exchange between systems—Local and metropolitan area networks—Specific requirements. Part 11: Wireless LAN Medium Access Control (MAC) and Physical Layer (PHY) Specifications. IEEE Std 802.11™-2007 (Revision of IEEE Std 802.11-1999 ).

IEEE Transactions on Communications, vol. 47, No. 11, Nov. 1999; "Optimum Receiver Design for Wireless Broad-Band Systems Using OFDM—Part I"; Michael Speth Stefan A. Fechtel, Gunnar Fock, and Heinrich Meyr; 10 pages.

IEEE P802.11ad/D5.0, Draft Standard for Information Technology—Telecommunications and Information Exchange Between Systems—Local and Metropolitan Area Networks—Specific Requirements Part 11: Wireless LAN Medium Access Control (MAC) and Physical Layer (PHY) Specifications Amendment 3: Enhancements for Very High Throughput in the 60 GHz Band; Sep. 2011; 601 pages.

International Preliminary Report on Patentability and Written Opinion for PCT/US2012/030916, mailed on Oct. 9, 2014, 6 pages.

* cited by examiner

DEVICE, SYSTEM AND METHOD OF COMMUNICATING A WIRELESS COMMUNICATION ORTHOGONAL-FREQUENCY-DIVISION-MULTIPLEXING SIGNAL

BACKGROUND

Phase noise is one of the main Radio Frequency (RF) distortion factors limiting high-throughput transmission of wireless communication systems operating at high carrier frequency, e.g., 60 Gigahertz (GHz).

The phase noise represents random phase modulation of the carrier frequency. The phase noise is caused by local oscillator instability and multiple carrier frequency transformations in a RF front-end chain, which may be included in a receiver and/or a transmitter.

A wireless communication system implementing an Orthogonal-Frequency-Division-Multiplexing (OFDM) communication scheme with high throughput may be sensitive to phase noise impairments of OFDM communication signals, when using high order modulations, e.g., 16 Quadrature-Amplitude-Modulation (QAM) or 64 QAM.

The current solutions to correct the phase error are based on receiver techniques configured to apply correction of common phase error by using pilot signals, or by a compensation, which may apply more advanced Decision Aided (DA) schemes. The current solutions have limitations, which may not be suitable for OFDM communication scheme with high throughput. For example, the first solution only corrects common phase error and does not compensate Inter Carrier Interference (ICI). The second solution allows estimating the ICI, but has high implementation complexity that often limits its realization in practical high throughput devices.

BRIEF DESCRIPTION OF THE DRAWINGS

For simplicity and clarity of illustration, elements shown in the figures have not necessarily been drawn to scale. For example, the dimensions of some of the elements may be exaggerated relative to other elements for clarity of presentation. Furthermore, reference numerals may be repeated among the figures to indicate corresponding or analogous elements. The figures are listed below.

DETAILED DESCRIPTION

In the following detailed description, numerous specific details are set forth in order to provide a thorough understanding of some embodiments. However, it will be understood by persons of ordinary skill in the art that some embodiments may be practiced without these specific details. In other instances, well-known methods, procedures, components, units and/or circuits have not been described in detail so as not to obscure the discussion.

Discussions herein utilizing terms such as, for example, "processing", "computing", "calculating", "determining", "establishing", "analyzing", "checking", or the like, may refer to operation(s) and/or process(es) of a computer, a computing platform, computing system, or other electronic computing device, that manipulate and/or transform data represented as physical (e.g., electronic) quantities within the computer's registers and/or memories into other data similarly represented as physical quantities within the computer's registers and/or memories or other information storage medium that may store instructions to perform operations and/or processes.

The terms "plurality" and "a plurality" as used herein include, for example, "multiple" or "two or more", For example, "a plurality of items" includes two or more items.

Some embodiments may be used in conjunction with various devices and systems, for example, a Personal Computer (PC), a desktop computer, a mobile computer, a laptop computer, a notebook computer, a tablet computer, a server computer, a handheld computer, a handheld device, a Personal Digital Assistant (PDA) device, a handheld PDA device, an on-board device, an off-board device, a hybrid device, a vehicular device, a non-vehicular device, a mobile or portable device, a consumer device, a non-mobile or non-portable device, a wireless communication station, a wireless communication device, a wireless Access Point (AP), a wired or wireless router, a wired or wireless modem, a video device, an audio device, an audio-video (A/V) device, a Set-Top-Box (STB), a Blu-ray disc (BD) player, a BD recorder, a Digital Video Disc (DVD) player, a High Definition (HD) DVD player, a DVD recorder, a HD DVD recorder, a Personal Video Recorder (PVR), a broadcast HD receiver, a video source, an audio source, a video sink, an audio sink, a stereo tuner, a broadcast radio receiver, a flat panel display, a Personal Media Player (PMP), a digital video camera (DVC), a digital audio player, a speaker, an audio receiver, an audio amplifier, a gaming device, a data source, a data sink, a Digital Still camera (DSC), a wired or wireless network, a wireless area network, a Wireless Video Area Network (WVAN), a Local Area Network (LAN), a Wireless LAN (WLAN), a Wireless Metropolitan Area. Network (WMAN) communication system, a Personal Area Network (PAN), a Wireless PAN (WPAN), devices and/or networks operating in accordance with existing IEEE 802.11 standards ("the 802.11 standards"), e.g., including IEEE 802.11 (*IEEE 802.11-2007: Standard for Information technology—Telecommunications and information exchange between systems—Local and metropolitan area networks Specific requirements, Part 11: Wireless LAN Medium Access Control (MAC) and Physical Layer (PHY) Specifications—June* 2007), 802.11n ("*IEEE 802.11n-2009—Amendment 5: Enhancements for Higher Throughput. IEEE-SA. 29 October* 2009"), 802.11ac ("*Very high Throughput <6 Ghz*"), 802.11 task group ad (TGad) ("*Very High Throughput 60 GHz*"), and/or future versions and/or derivatives thereof, devices, and/or networks operating in accordance with IEEE 802.16 standards ("the 802.16 standards"), e.g., including 802.16 (*IEEE-Std* 802.16, 2004 *Edition, Air Interface for Fixed Broadband Wireless Access Systems*), 802.16d, 802.16e (*IEEE-Std* 802.16e, 2005 *Edition, Physical and Medium Access Control Layers for Combined Fixed and Mobile Operation in Licensed Bands*), 802.16f, 802.16m standards and/or future versions and/or derivatives thereof, devices, and/or networks operating in accordance with existing Wireless-Gigabit-Alliance (WGA) and/or WirelessHD™ specifications and/or future versions and/or derivatives thereof, devices and/or networks operating in accordance with existing cellular specifications and/or protocols, e.g., 3rd Generation Partnership Project (3GPP), 3GPP Long Term Evolution (LTE), and/or future versions and/or derivatives thereof, units and/or devices which are part of the above networks, one way and/or two-way radio communication systems, cellular radio-telephone communication systems, a cellular telephone, a wireless telephone, a Personal Communication Systems (PCS) device, a PDA device which incorporates a wireless communication device, a mobile or portable Global Positioning System (GPS) device, a device which incorporates a GPS receiver or transceiver or chip, a device which incorporates an RFID element or chip, a Multiple Input Multiple Output (MIMO) transceiver or device, a device having one or more internal antennas and/or external antennas, Digital Video Broadcast (DVB) devices or systems, multi-standard radio devices or systems, a wired or wireless handheld device (e.g., BlackBerry, Palm Treo), a Wireless Application Protocol (WAP) device, or the like.

Some embodiments may be used in conjunction with one or more types of wireless communication signals and/or systems, for example, Radio Frequency (RF), infra Red (IR), Frequency-Division Multiplexing (FDM), Orthogonal FDM (OFDM), Time-Division Multiplexing (TDM), Time-Division Multiple Access (TDMA), Extended TDMA (E-TDMA), General Packet Radio Service (GPRS), extended GPRS, Code-Division Multiple Access (CDMA), Wideband CDMA (WCDMA), CDMA 2000, single-carrier CDMA, multi-carrier CDMA, Multi-Carrier Modulation (MDM), Discrete Multi-Tone (DMT), Bluetooth®, Global Positioning System (GPS), Wi-Fi, Wi-Max, ZigBee™, Ultra-Wideband (UWB), Global System for Mobile communication (GSM), 2G, 2.5G, 3G, 3.5G, Enhanced Data rates for GSM Evolution (EDGE), or the like. Other embodiments may be used in various other devices, systems and/or networks.

The term "wireless device" as used herein includes, for example, a device capable of wireless communication, a communication device capable of wireless communication, a communication station capable of wireless communication, a portable or non-portable device capable of wireless communication, or the like. In some demonstrative embodiments, a wireless device may be or may include a peripheral that is integrated with a computer, or a peripheral that is attached to a computer. In some demonstrative embodiments, the term "wireless device" may be used to provide a wireless service.

The term "communicating" as used herein with respect to a wireless communication signal includes transmitting the wireless communication signal and/or receiving the wireless communication signal. For example, a wireless communication unit, which is capable of communicating a wireless communication signal, may include a wireless transmitter to transmit the wireless communication signal to at least one other wireless communication unit, and/or a wireless communication receiver to receive the wireless communication signal from at least one other wireless communication unit.

Some demonstrative embodiments may be used in conjunction with a wireless communication network communicating over a frequency band of 60 GHz. However, other embodiments may be implemented utilizing any other suitable wireless communication frequency bands, for example, an Extremely High Frequency (EHF) band (the millimeter wave (mmwave) frequency band), e.g., a frequency band within the frequency band of between 30 Ghz and 300 GHZ, a WLAN frequency band, a WPAN frequency band, a frequency band according to the WGA specification, and the like.

Figure 1:
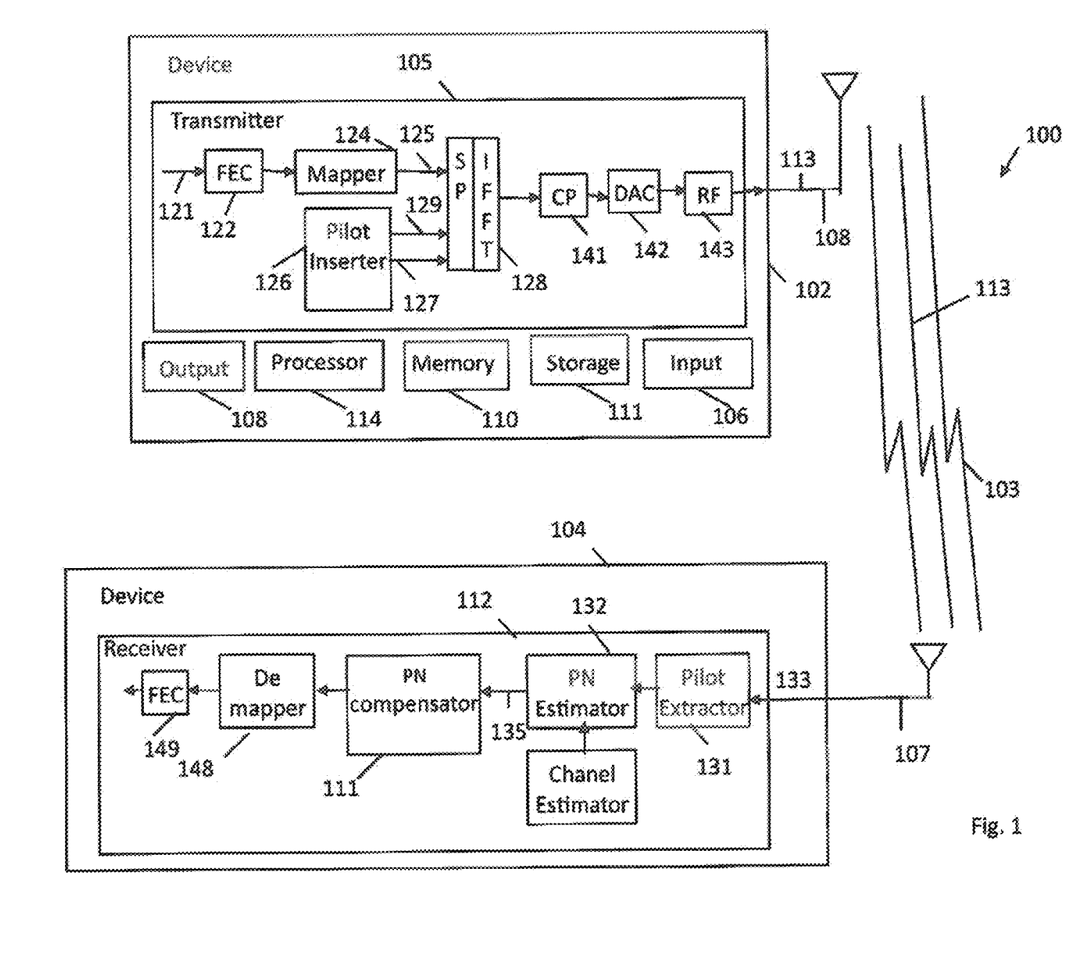
FIG. 1 is a schematic block diagram illustration of a system, in accordance with some demonstrative embodiments.

Reference is now made to FIG. 1, which schematically illustrates a block diagram of a wireless communication system 100, in accordance with some demonstrative embodiments.

In some demonstrative embodiments, system 100 may include one or more devices, e.g., devices 102 and 104, capable of communicating wireless communication signals over a wireless communication channel 103. For example, device 102 may include a transmitter 105 capable of transmitting wireless signals via one or more antennas 108; and/or device 104 may include a receiver 112 capable of receiving the wireless signals over wireless channel 103 via one or more antennas 107.

In some demonstrative embodiments, antennas 108 and/or 107 may include any type of antennas suitable for transmitting and/or receiving wireless communication signals, blocks, frames, transmission streams, packets, messages and/or data. Types of antennas that may be used for antennas 108 and/or 107 may include but are not limited to internal antenna, dipole antenna, omni-directional antenna, a monopole antenna, an end fed antenna, a circularly polarized antenna, a micro-strip antenna, a diversity antenna, a phase array antenna and the like. In some embodiments, antennas 108 and/or 107 may implement transmit and receive functionalities using separate transmit and receive antenna elements. In some embodiments, antennas 108 and/or 107 may implement transmit and receive functionalities using common and/or integrated transmit/receive elements.

In some demonstrative embodiments, devices 102 and/or 104 may include, or may be included as part of, for example, a PC, a desktop computer, a mobile computer, a laptop computer, a notebook computer, a tablet computer, a server computer, a handheld computer, a handheld device, a PDA device, a handheld PDA device, an on-board device, an off-board device, a hybrid device (e.g., combining cellular phone functionalities with PDA device functionalities), a consumer device, a vehicular device, a non-vehicular device, a mobile or portable device, a non-mobile or non-portable device, a cellular telephone, a PCS device, a PDA device which incorporates a wireless communication device, a mobile or portable GPS device, a DVB device, a relatively small computing device, a non-desktop computer, a "Carry Small Live Large" (CSLL) device, an Ultra Mobile Device (UMD), an Ultra Mobile PC (UMPC), a Mobile Internet Device (MID), an "Origami" device or computing device, a device that supports Dynamically Composable Computing (DCC), a context-aware device, a video device, an audio device, an A/V device, a STB, a BD player, a BD recorder, a DVD player, a HD DVD player, a DVD recorder, a HD DVD recorder, a PVR, a broadcast HD receiver, a video source, an audio source, a video sink, an audio sink, a stereo tuner, a broadcast radio receiver, a flat panel display, a PMP, a DVC, a digital audio player, a speaker, an audio receiver, a gaming device, an audio amplifier, a data source, a data sink, a DSC, a media player, a Smartphone, a television, a music player, or the like.

In some demonstrative embodiments, device 102 may also include, for example, one or more of a processor 114, an input unit 106, an output unit 108, a memory unit 110, and a storage unit 111. Device 102 may optionally include other suitable hardware components and/or software components. In some embodiments, some or all of the components of device 102 may be enclosed in a common housing or packaging, and may be interconnected or operably associated using one or more wired or wireless links. In other embodiments, components of device 102 may be distributed among multiple or separate devices or locations.

Processor 114 includes, for example, a Central Processing Unit (CPU), a Digital Signal Processor (DSP), one or more processor cores, a single-core processor, a dual-core processor, a multiple-core processor, a microprocessor, a host processor, a controller, a plurality of processors or controllers, a chip, a microchip, one or more circuits, circuitry, a logic unit, an Integrated Circuit (IC), an Application-Specific IC (ASIC), or any other suitable multi-purpose or specific processor or controller. Processor 114 executes instructions, for example, of an Operating System (OS) of wireless communication device 102 and/or of one or more suitable applications.

Input unit 106 includes, for example, a keyboard, a keypad, a mouse, a touch-pad, a track-ball, a stylus, a microphone, or other suitable pointing device or input device. Output unit 108 includes, for example, a monitor, a screen, a flat panel display, a Cathode Ray Tube (CRT) display unit, a Liquid Crystal Display (LCD) display unit, a plasma display unit, one or more audio speakers or earphones, or other suitable output devices.

Memory unit 110 includes, for example, a Random Access Memory (RAM), a Read Only Memory (ROM), a Dynamic RAM (DRAM), a Synchronous DRAM (SD-RAM), a flash memory, a volatile memory, a non-volatile memory, a cache memory, a buffer, a short term memory unit, a long term memory unit, or other suitable memory units. Storage unit 111 includes, for example, a hard disk drive, a floppy disk drive, a Compact Disk (CD) drive, a CD-ROM drive, a DVD drive, or other suitable removable or non-removable storage units. Memory unit 110 and/or storage unit 111, for example, may store data processed by wireless communication device 102.

In some demonstrative embodiments, transmitter 105 may be configured to transmit an OFDM wireless communication signal 113 via antennas 108 over wireless communication channel 103.

In some demonstrative embodiments, receiver 112 may be configured to receive signal 113 via antenna 107.

In some demonstrative embodiments, signal 113 may be affected by phase noise. For example, signal 113 may be affected by phase noise generated by a local oscillator and/or other components, which may be included in transmitter 105 and/or receiver 112.

In some demonstrative embodiments, transmitter 105 may insert a plurality of zero subcarriers surrounding a pilot subcarrier in signal 113, e.g., as described in detail below.

In some demonstrative embodiments, receiver 112 may use the plurality of zero subcarriers and the pilot subcarrier to estimate and compensate the phase noise of signal 113, e.g., as described below.

In some demonstrative embodiments, transmitter 105 may transmit signal 113 including a plurality of data subcarriers carrying data, at least one pilot subcarrier carrying a reference, predefined, value, and a plurality of zero subcarriers, carrying a zero value, surrounding the pilot subcarrier and separating between the pilot subcarrier and the data subcarriers, e.g., as described in detail below.

In some demonstrative embodiments, receiver 112 may receive signal 113 including the plurality of data subcarriers, the at least one pilot subcarrier and the plurality of zero subcarriers, surrounding the pilot subcarrier, and may estimate a spectrum of the phase noise affecting signal 113, based on the pilot subcarrier and two or more of the plurality of the zero subcarriers, e.g., as described in detail below.

In some demonstrative embodiments, receiver 112 may compensate the phase noise based on the estimated phase noise spectrum, e.g., as described below.

In some demonstrative embodiments, transmitter 105 may include a Forward Error Correction (FEC) chain Block 122 configured to encode a data signal 121.

In some demonstrative embodiments, transmitter 105 may include a mapper 124 configured to map an output of FEC block 122 into Quadrature-Amplitude-Modulation (QAM) data subcarriers 125.

In some demonstrative embodiments, transmitter 105 may include a pilot inserter 126 configured to insert into data subcarriers 125, at least one pilot subcarrier 127, and a plurality of zero subcarriers 129 surrounding the pilot subcarrier 127.

In some demonstrative embodiments, the plurality of zero subcarriers 129 may include an even number of zero subcarriers symmetrically surrounding pilot subcarrier 127, such that the same number of zero subcarriers 129 is located on each side of pilot subcarrier 127, between pilot subcarrier 127 and data subcarriers 125.

For example, in some demonstrative embodiments, the plurality of zero subcarriers may include at least four zero subcarriers, for example, at least six zero subcarriers, e.g., at least ten zero subcarriers.

In some demonstrative embodiments, pilot inserter 126 may be configured to increase an energy of pilot subcarrier 127. Increasing the power of pilot subcarrier 127 may improve the accuracy of instantaneous phase noise spectrum measurements. For example, increasing the energy of pilot subcarrier 127 may emphasize the instantaneous phase noise spectrum components from pilot subcarrier 127, e.g., compared to Inter Carrier Interference (ICI) contributions from data subcarriers 125.

In some demonstrative embodiments, a power difference between the power of pilot subcarrier 127 and data subcarriers 125 may be based on a number of the zero subcarriers. For example, the power of pilot subcarrier 127 may be based on the number of the plurality of zero subcarriers surrounding pilot subcarrier 127. For example, pilot inserter 126 may utilize an energy, which may be intended for the zero subcarriers, for pilot subcarrier 127 in order to increase the energy of pilot subcarrier 127.

In one example, the energy of pilot subcarrier 127, denoted "Pilot Energy", may be calculated as follows:

$$\text{Pilot Energy} = E_{pilot} * 2N_{zeroes} \quad (1)$$

wherein $2N_{zeroes}$ denotes the number of the plurality of zero subcarriers 129 surrounding pilot subcarrier 127, and wherein $E_{pilot}$ denotes a common energy of a single pilot signal, without increasing the power.

In some demonstrative embodiments, pilot inserter 126 may select a suitable number of the plurality of zero subcarriers 129 in order to enable receiver 112 to better estimate the instantaneous phase noise spectrum and to facilitate more accurate measurements.

In some demonstrative embodiments, pilot inserter 126 may select the number of the plurality of zero subcarriers as a static, predefined, constant number. For example, the number of the plurality of zero subcarriers may be set in compliance with any suitable standardization requirements.

In some demonstrative embodiments, pilot inserter 126 may select the number of the plurality of zero subcarriers dynamically, for example, based on one or more criteria relating to channel 103, signal 113, and the like, e.g., as described below.

In one example, transmitter 105 may determine a number of the plurality of zero subcarriers based on an input from receiver 112, e.g., as described below.

In another example, transmitter 105 may select the number of the plurality of zero subcarriers based on a constellation size of OFDM signal 113. For example, transmitter 105 may select a first number of the plurality of zero subcarriers for a first constellation size, and a second number, which is greater than the first number, for a second constellation size, which is greater than the first constellation size. For example, transmitter 105 may select a first number of zero subcarriers for a small constellation size, e.g., QPSK, and a second, greater, number of zero subcarriers, for a large constellation size, e.g., 64 QAM.

In yet another example, transmitter 105 may select the number of the plurality of zero subcarriers based on a condition of channel 103. For example, transmitter 105 may select the number of the plurality of zero subcarriers according to a Signal to a Noise Ratio (SNR) of channel 103. For example, transmitter 105 may select a greater number of zero subcarriers for a high SNR channel.

In some demonstrative embodiments, transmitter 105 may include a Serial to Parallel (S/P) and Inverse Fast Fourier Transform (IFFT) block 128 configured to compose an OFDM signal from data subcarriers 125, from pilot subcarrier 127, and the plurality of zero subcarriers 129.

In some demonstrative embodiments, transmitter 105 may include additional components configured to further process the OFDM signal and to generate transmitted signal 113. For example, transmitter may include a Cyclic Prefix (CP) inserter 141, a Digital to Analog Converter (DAC) 142 and a RF chain block 143.

Figure 2A:
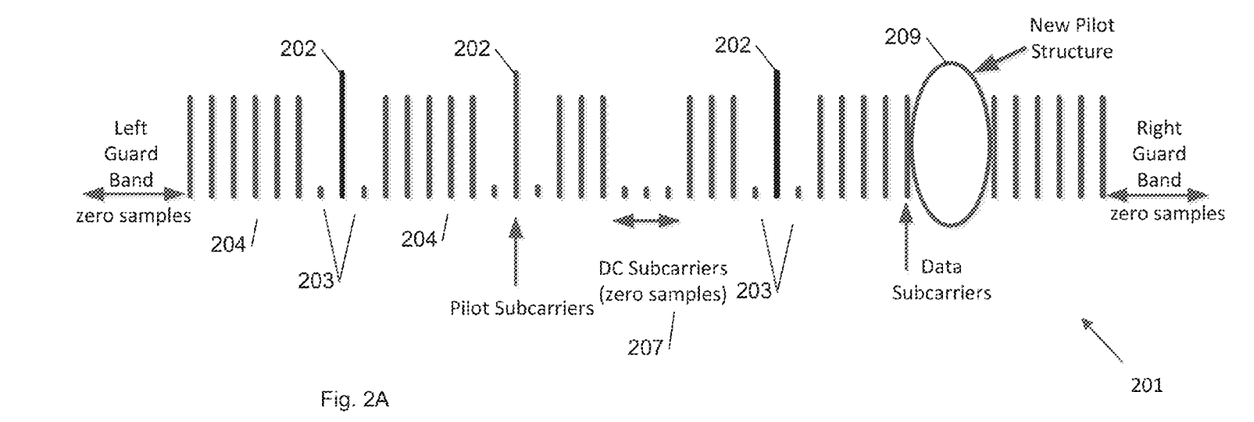
FIGS. 2A and 2B are a schematic illustrations of a structure of an OFDM and a portion of the OFDM signal, respectively, in accordance with some demonstrative embodiments.

Reference is now made to FIG. 2A, which schematically illustrates a structure 201 of an OFDM signal, in accordance with some demonstrative embodiments. For example, signal 113 may have structure 201.

In some demonstrative embodiments, structure 201 may include a plurality of pilot subcarriers 202 including a reference, predefined, value.

In some demonstrative embodiments, structure 201 may include a plurality of data subcarriers 204 including data symbols configured to carry data of signal 121 (FIG. 1), e.g., QAM data symbols.

In some demonstrative embodiments, structure 201 may include a plurality of DC subcarriers 207 including zero samples, separating between data subcarriers 204.

In some demonstrative embodiments, structure 201 may include a plurality of zero subcarriers 203, including a zero value, surrounding pilot subcarriers 202, and configured to separate between data subcarriers 204 and pilot subcarriers 202.

Figure 2B:
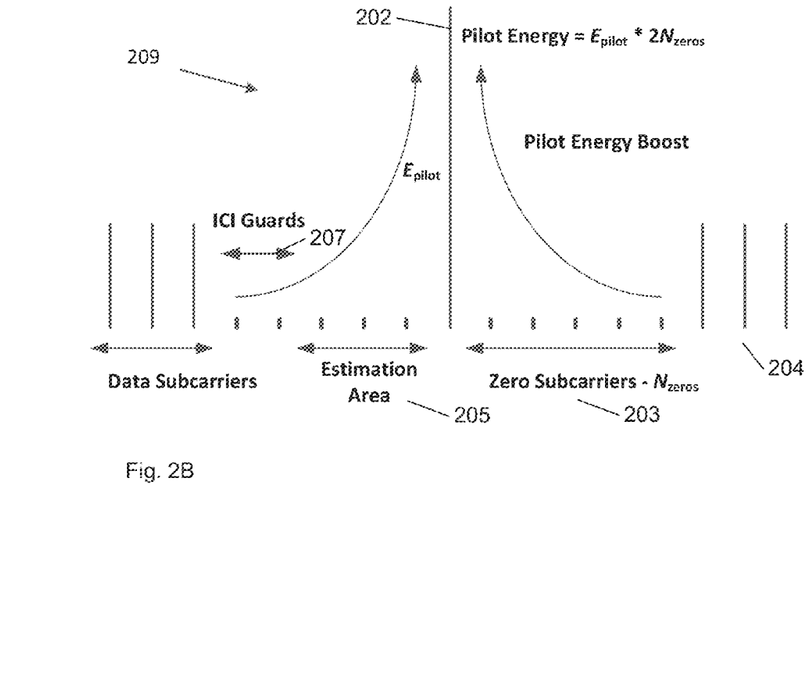

Reference is now made to FIG. 2B, which schematically illustrates a portion 209 of structure 201, in accordance with some demonstrative embodiments.

In some demonstrative embodiments, as shown in FIG. 2B, portion 209 may include a pilot subcarrier 202 surrounded by a plurality of zero subcarriers 203 separating between data subcarriers 204 and pilot subcarrier 202.

As shown in FIG. 2B, zero subcarriers 203 may include, for example, an even number of zero subcarriers symmetrically surrounding pilot subcarrier 202, such that the same number of zero subcarriers is located on each side of pilot subcarrier 202 between pilot subcarrier 202 and data subcarriers 204. For example, zero subcarriers 203 may include ten zero subcarriers, such that five zero subcarriers are located on each side of pilot subcarrier 202. In other embodiments, zero subcarriers 203 may include any other suitable number of subcarriers.

As also shown in FIG. 2B, a power of pilot subcarrier 202 may be greater than a power of data subcarriers 204.

Referring back to FIG. 1, in some demonstrative embodiments, receiver 112 may receive signal 113 including the plurality of data subcarriers 125 carrying data, the pilot subcarrier 127 carrying a reference, predefined, value, and the plurality of zero subcarriers 129, carrying a zero value, surrounding pilot subcarrier 127 and separating between pilot subcarrier 127 and data subcarriers 125.

In some demonstrative embodiments, receiver 112 may estimate a phase noise spectrum affecting signal 113 based on pilot subcarrier 127 and the plurality of the zero subcarriers 129 surrounding pilot subcarrier 127, and may compensate the phase noise based on the estimated phase noise spectrum, e.g., as described in detail below.

In some demonstrative embodiments, receiver 112 may include a pilot extractor 131 configured to extract pilot subcarrier 127 from the structure of a signal 133, which may correspond to signal 113. For example, signal 133 may include signal 113 in the frequency-domain. For example, pilot extractor 131 may extract pilot subcarrier 202 (FIG. 2A) from structure 201 (FIG. 2A).

In some demonstrative embodiments, receiver 112 may be configured to estimate an instantaneous phase noise spectrum of pilot subcarrier 127.

In some demonstrative embodiments, receiver 112 may include a Phase Noise (PN) estimator 132 configured to estimate a phase noise spectrum 135 of signal 133 based on pilot subcarriers 127 and the plurality of zero subcarriers 129 surrounding pilot subcarrier 127. For example, PN estimator 132 may combine and average a phase noise spectrum of the plurality of transmitted pilots 202 (FIG. 2A) and the plurality of zero subcarriers 203 surrounding pilot subcarriers 202. (FIG. 2A), respectively.

In some demonstrative embodiments, zero subcarriers 129 may include a first number of zero subcarriers, and PN estimator 132 may estimate the phase noise spectrum based on a selected plurality of the zero subcarriers including a second number of the zero subcarriers.

In some demonstrative embodiments, PN estimator 132 may select the second number to be lesser than the first number.

Referring back to FIG. 2B, in some demonstrative embodiments, receiver 112 (FIG. 1) may select a plurality of zero subcarriers 205 from zero subcarriers 203 including the second number of zero subcarriers to estimate the phase noise spectrum.

As shown in FIG. 2B, the second number of zero subcarriers 205 may be lesser than the number of zero subcarriers 203. For example, receiver 112 may select six zero subcarriers 205 out of ten zero subcarriers 203 surrounding pilot subcarrier 202 to estimate the phase noise spectrum.

In some demonstrative embodiments, PN estimator 132 (FIG. 1) may use a remaining plurality of zero subcarriers, e.g., not the selected plurality of zero subcarriers, as ICI Guard subcarriers configured to prevent ICI impact of the data subcarriers.

As shown in FIG. 2B, the remaining zero subcarriers of zero subcarriers 203 may be utilized as ICI Guard subcarriers 207 to prevent ICI impact from data subcarriers 204.

Referring back to FIG. 1, in some demonstrative embodiments, PN estimator 132 may select the second number of zero subcarriers to be used for estimating the spectrum based on a constellation size of signal 113. In one example, for low order modulations, e.g., QPSK, operating in the low SNR range, it may be better to have one or more subcarriers to enhance estimation accuracy of the phase noise spectrum. In another example, for high order modulations, e.g., 64 QAM, operating in the high SNR range, it may better to estimate more phase noise spectrum coefficients and apply an ICI guard bandwidth equal to zero, e.g., a reduced number of ICI subcarriers or even no ICI subcarriers may be used.

In some demonstrative embodiments, PN estimator 132 may select the second number of zero subcarriers to be used for estimating the spectrum, for example, based on at least one criterion relating to a condition of channel 103. For example, PN estimator 132 may reduce the second number of the zero subcarriers in response to degradation of channel 103, e.g., a degradation in the SNR of channel 103.

In some demonstrative embodiments, PN estimator 132 may estimate the phase noise by determining a number of coefficients, which may be used for estimating the instantaneous phase noise spectrum of signal 113 according to the zero subcarriers and to the number of ICI Guard subcarriers, e.g., zero subcarriers 203 and ICI guard subcarriers 207 (FIG. 2B).

For example, PN estimator 132 may calculate the number of coefficients, denoted $N_{PN\_coefs}$, for approximation of the instantaneous phase noise spectrum of signal 113, e.g., as follows:

$$N_{PN\_coefs} = 2N_{zeros} - 2N_{GB} + 1 \quad (2)$$

wherein $2N_{GB}$ denotes the number of ICI guard subcarriers, e.g., ICI Guard subcarriers 207 (FIG. 2B).

In some demonstrative embodiments, PN estimator 132 may estimate the phase noise spectrum components by estimating a plurality of coefficients, denoted $\hat{J}_l$, in the Phase Noise spectrum, e.g., as follows:

$$\hat{J}_l = \frac{\sum_{k \in N_{SP}} \hat{H}^*_{k+l} S^*_k R_{k+l}}{\sum_{k \in N_{SP}} |\hat{H}_{k+l}|^2}, \; l = -\frac{N_{PN\_coefs}-1}{2} : \frac{N_{PN\_coefs}-1}{2} \quad (3)$$

wherein k denotes a pilot signal index in OFDM signal spectrum, $\hat{J}_l$ denotes an estimation of coefficient with index l in the Phase Noise spectrum, e.g., l=0 corresponds to a DC component, $R_{k+l}$ denotes a received pilot signal response at the subcarriers k+l, $S_k$ denotes a known pilot signal at the subcarrier k, $\hat{H}_{k+l}$ denotes a channel estimation at the subcarrier k+l, $N_{SP}$ denotes a number of pilot subcarriers defined for an OFDM symbol, and * denotes a complex conjugation function.

In some demonstrative embodiments, PN estimator 132 may further combine and average all the estimations of the phase noise spectrum of all pilot subcarriers surrounded by the zero subcarriers, e.g., the plurality of pilot subcarriers 202 surrounded by a plurality zero subcarriers 203 (FIG. 2A), e.g., in order to improve estimation accuracy.

In some demonstrative embodiments, receiver 112 may include a PN compensator 133 configured to compensate the phase noise of signal 113 based on the estimated phase noise spectrum 135 of signal 113, e.g., as estimated by estimator 132.

In some demonstrative embodiments, receiver 112 may implement the phase noise compensation, either in a frequency-domain or in a time-domain. For example, multiplication of two signals in the time-domain may be equal to a circular convolution of signal spectra in the frequency-domain.

In some demonstrative embodiments, phase noise compensation may be performed in the frequency-domain by de-convoluting signal 113 with the inverse function of phase noise spectrum 135 of signal 113 using a matched filter, e.g., as described below with reference to FIG. 3.

In some demonstrative embodiments, phase noise compensation may be performed in the time-domain by de-rotating a phase of signal 113 based on the estimated phase noise trajectory in time-domain derived from the instantaneous phase noise spectrum 135 in the frequency-domain, e.g., as described below with reference to FIG. 4.

In some demonstrative embodiments, receiver 112 may transmit to transmitter 105 an indication of a number of the plurality of zero subcarriers to be included in another OFDM signal transmitted from transmitter 105. For example, transmitter 105 may adjust the number of zero subcarriers 109, which may be included in another, subsequent, OFDM signal, according to the indication from receiver 112.

In some demonstrative embodiments, receiver 112 may include additional elements configured to further process signal 113 after compensating the phase noise affecting signal 313. For example, receiver 112 may include a demapper 148 and a FEC decoding block 149.

Figure 3:
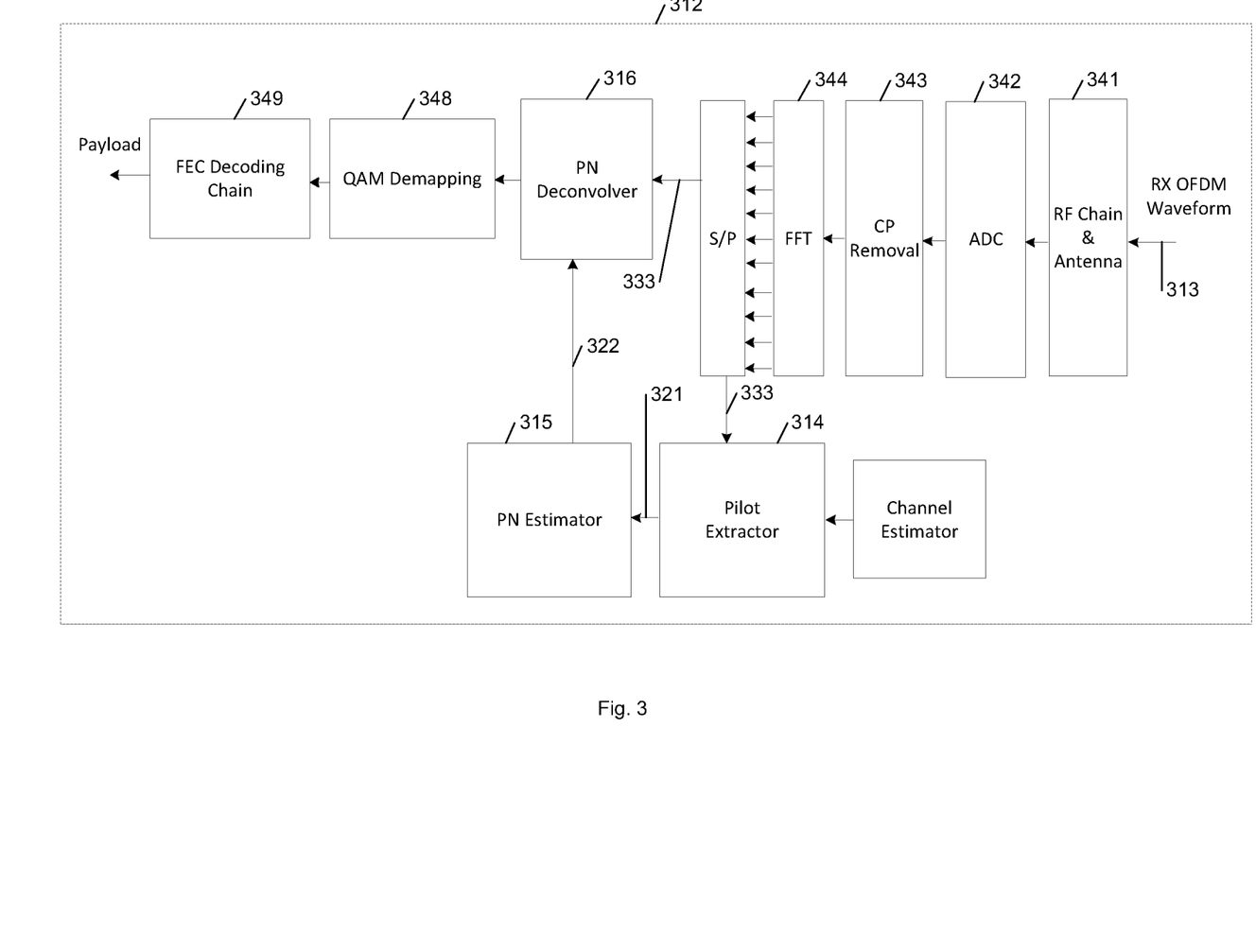
FIG. 3 is a schematic block diagram illustration of a receiver, which implements phase noise compensation in a frequency-domain, in accordance with some demonstrative embodiments.

Reference is now made to FIG. 3, which schematically illustrates a block diagram of a receiver 311, which implements phase noise compensation in the frequency-domain, in accordance with some demonstrative embodiments. For example, receiver 312 may perform the functionality of receiver 112 (FIG. 1).

In some demonstrative embodiments, receiver 311 may receive an OFDM signal 313, e.g., transmitted from transmitter 105 (FIG. 1). For example, signal 313 may have structure 201 (FIG. 2A).

In some demonstrative embodiments, receiver 312 may estimate a phase noise spectrum affecting signal 313 based on the pilot subcarrier and the plurality of the zero subcarriers surrounding the pilot subcarrier, and may compensate the phase noise in frequency-domain based on the estimated phase noise spectrum, e.g., as described in detail below.

In some demonstrative embodiments, receiver 312 may include any suitable components configured to process signal 313 in the time-domain. For example, receiver 312 may include a RF Chain block 341, an ADC 342 and a CP remover 343.

In some demonstrative embodiments, receiver 312 may include a Fast Fourier Transform (FFT) and Serial to Parallel (S/P) block 344 configured to transfer signal 313 from the time-domain into a signal 333 in the frequency domain.

In some demonstrative embodiments, receiver 312 may include a pilot extractor 314 in the frequency-domain, configured to extract pilot subcarrier 321 and the plurality of zero subcarriers surrounding pilot subcarrier 321 from the position of pilot subcarrier and the surrounding zero subcarriers of signal 313.

In some demonstrative embodiments, receiver 312 may include a PN estimator 315 in the frequency-domain, configured to estimate a phase noise spectrum 322 of signal 321 based on pilot subcarrier 321 and the plurality of zero subcarriers. For example, PN estimator 315 may determine the phase noise spectrum according to Equation 3.

In some demonstrative embodiments, receiver 312 may include a PN deconvolver 316 configured to compensate the phase noise in the frequency-domain based on the estimated phase noise spectrum 322. For example, PN deconvolver 316 may deconvolve the received signal 333 with the inverse function of the estimated PN spectrum 322, for example, by using a Matched Filter (MF), e.g., as described in detail below.

In some demonstrative embodiments, a demodulated carrier amplitude, denoted $R_k$, of a subcarrier of an OFDM signal in the frequency-domain, e.g., in case of frequency flat channel, may be represented, e.g., as follows:

$$R_k = \sum_{i=0}^{N-1} X_k J_{k-1} + n_k \quad (4)$$

wherein $X_k$ denotes a QAM symbol transmitted at the subcarrier k, wherein J denotes the total resulting Phase Noise spectrum coefficients resulting from both the transmitter and the receiver, wherein $n_k$ denotes an Additive White Gaussian Noise (AWGN) value at the subcarrier k, and wherein N denotes the number of subcarriers in the OFDM symbol.

For example, in some demonstrative embodiments, a demodulated carrier amplitude of signal 313 may be represented by Equation 4.

In some demonstrative embodiments, the compensation of phase noise in the frequency-domain may be performed by convolution of the OFDM signal with a de-convolution Finite Impulse Response (FIR) filter. For example, the received frequency domain signal may be de-convolved with the inverse function of the instantaneous phase noise spectrum 322.

In some demonstrative embodiments, a MF may be utilized to perform the de-convolution. For example, a matched filter function, denoted MF(f) of the MF may be represented, e.g., as follows:

$$MF(f)=J^*(-f)\cdot J^*(-f) \otimes J(f)=\delta(f) \quad (5)$$

wherein J(f) denotes the Phase Noise (PN) spectrum, wherein $\otimes$ denotes circular convolution, and wherein $\delta$(f) denotes a delta function.

In some demonstrative embodiments, it may be shown that the MF may perform the de-convolution of Equation 5, for example, using the following two considerations:

$$\exp(j\phi(t))\cdot\exp(-j\phi(t))=1 \quad (6)$$

$$FFT(|\exp(j\phi(t))|^2)=J(f) \otimes J^*(-f)=\delta(f) \quad (7)$$

It may be seen that the product of Equation 6 in the time-domain is a constant value. It may also be seen that Equation 7 in the frequency-domain is equal to a circular convolution of the phase noise spectrum and a reversed conjugated version of the phase noise spectrum, which is equal (transforms) to a delta function.

In some demonstrative embodiments, receiver 312 may include additional elements configured to further process signal 313 after compensating the phase noise affecting signal 313. For example, receiver 312 may include a demapper 348 and FEC decoding block 349.

Figure 4:
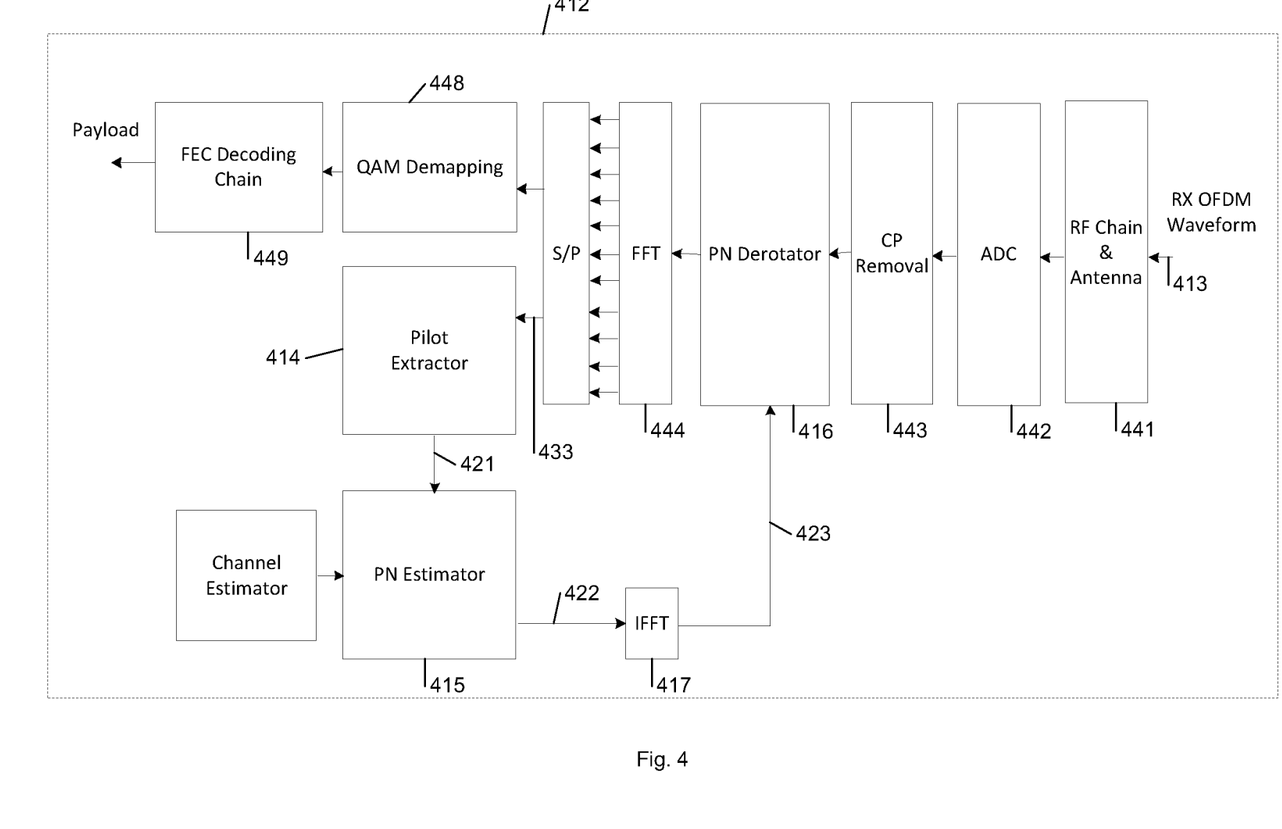
FIG. 4 is a schematic block diagram illustration of a receiver, which implements phase noise compensation in a time-domain, in accordance with some demonstrative embodiments.

Reference is now made to FIG. 4, which schematically illustrates a block diagram of a receiver 412, which implements phase noise compensation in the time-domain, in accordance with some demonstrative embodiments. For example, receiver 412 may perform the functionality of receiver 112 (FIG. 1).

In some demonstrative embodiments, receiver 412 may receive an OFDM signal 413, e.g., transmitted from transmitter 105 (FIG. 1). For example, signal 413 may have structure 201 (FIG. 2A).

In some demonstrative embodiments, receiver 412 may estimate a phase noise spectrum affecting signal 413 based on the pilot subcarrier and the plurality of the zero subcarriers surrounding the pilot subcarrier, and may compensate the phase noise in the time-domain based on the estimated phase noise spectrum, e.g., as described in detail below.

In some demonstrative embodiments, receiver 412 may include any suitable components configured to process signal 413 in the time-domain. For example, receiver 412 may include a RF chain Block 441, an ADC 442 and a CP remover 443.

In some demonstrative embodiments, receiver 412 may include a PN derotator 416 configured to compensate the phase noise affecting signal 413 in the time-domain, e.g., as described in detail below.

In some demonstrative embodiments, receiver 412 may include a FFT and S/P block 444 configured to transfer signal 413 from the time-domain into a signal 433 in the frequency-domain.

In some demonstrative embodiments, receiver 412 may include a pilot extractor 414 in the frequency-domain, configured to extract pilot subcarrier 421 and the plurality of zero subcarriers surrounding pilot subcarrier 421 from the position of pilot subcarrier and the surrounding zero subcarriers of signal 413.

In some demonstrative embodiments, receiver 412 may include a PN Estimator 415 in the frequency-domain, configured to estimate a phase noise spectrum 422 of signal 413 based on the pilot subcarrier and the plurality of zero subcarriers. For example PN estimator 415 may determine the phase noise spectrum 422, e.g., according to Equation 3.

In some demonstrative embodiments, receiver 412 may include an IFFT block 417 configured to apply an IFFT realization function to the estimated phase noise spectrum 422 in the frequency-domain, e.g., in order to obtain a corresponding phase noise trajectory 423 in the time-domain.

In some demonstrative embodiments, PN derotator 416 may compensate the phase noise, which affects signal 413, for example, based on phase noise trajectory 423 in the time-domain. For example, phase derotator 416 may conjugate phase noise trajectory 423 and may multiply the conjugated phase noise trajectory with signal 413.

In some demonstrative embodiments, a carrier frequency signal, denoted X(t), in presence of phase noise may be represented, e.g., as follows:

$$X(t)=A\cdot\exp(j2\pi f_c t+j\phi_n(t)) \quad (8)$$

wherein $f_c$ denotes a carrier frequency, wherein $\phi(t)$ denotes a random phase noise process in time, and wherein A(t) denotes an amplitude of an OFDM signal. For example, signal 413 may be represented by Equation 8.

In some demonstrative embodiments, a phase noise trajectory, e.g., corresponding to phase noise trajectory 423, may be expressed as to $\exp(j\phi(t))$. As described above, PN derotator 416 may conjugate the phase noise trajectory, and the conjugated phase noise trajectory may be expressed as $\exp(-j\phi(t))$. Accordingly, the conjugate of the phase noise trajectory may be expressed by phase de-rotation of the phase noise trajectory.

In some demonstrative embodiments, receiver 412 may include additional elements configured to further process signal 413 after compensating the phase noise affecting signal 413. For example, receiver 412 may include a demapper 448 and a FEC decoding block 449.

Figure 5:
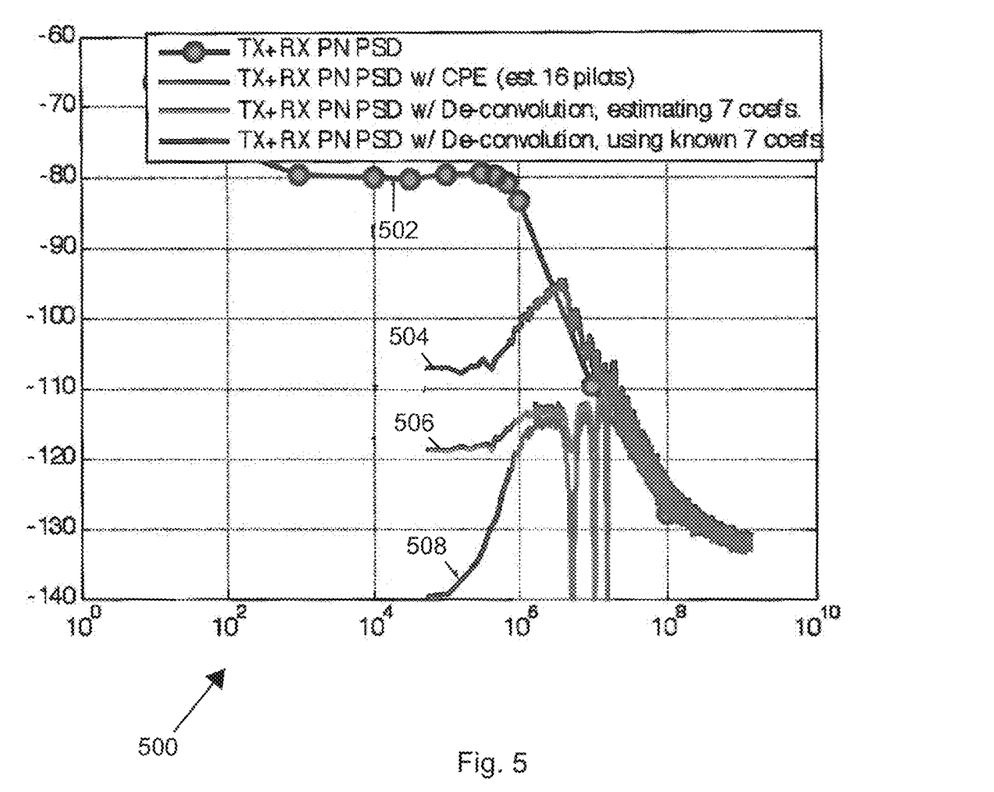
FIG. 5 is a schematic illustration of a graph depicting four receiver performance curves, in accordance with some demonstrative embodiments.

Reference is made to FIG. 5, which schematically illustrates a graph depicting receiver performance curves 502, 504, 506 and 508, corresponding to four respective receiver schemes, in accordance with some demonstrative embodiments.

Performance curves 502, 504 506 and 508 represent residual phase noise Power Spectral Density (PSD) values versus Frequency.

Curve 502 corresponds to a performance curve of a receiver, which does not implement any phase noise compensation method. The receiver performance curve corresponds to a typical OFDM signal generated by a general OFDM based system according to the physical parameters of OFDM based system, e.g., as defined by the IEEE 802.11 ad specification.

Curve 504 corresponds to a performance curve of a receiver implementing a known method of phase noise mitigation, e.g., Common Phase Error (CPE) compensation.

Curve 506 corresponds to a performance curve of a receiver implementing a deconvulation method in frequency-domain to compensate the phase noise, in accordance with some demonstrative embodiments. For example, curve 506 may correspond to a performance curve of receiver 312 (FIG. 3) with respect to signal 313 including six zero subcarriers 205 (FIG. 2B) surrounding pilot subcarrier 202 (FIG. 2B).

Curve 508 corresponds to a theoretical performance curve of a receiver implementing a deconvolution method in frequency-domain to compensate the phase noise, when the phase noise is already known, e.g., there is no need to estimate the phase noise.

It may be seen from FIG. 5, that the PSD of residual phase noise of curve 506 is improved by about 12-16 dB, depending on the frequency range, compared to the PSD of the known methods of phase noise compensating, e.g., as represented by curve 504. This improvement may result in a lesser ICI level in, which may enable high-throughput transmission in phase-noise limited systems.

Figure 6:
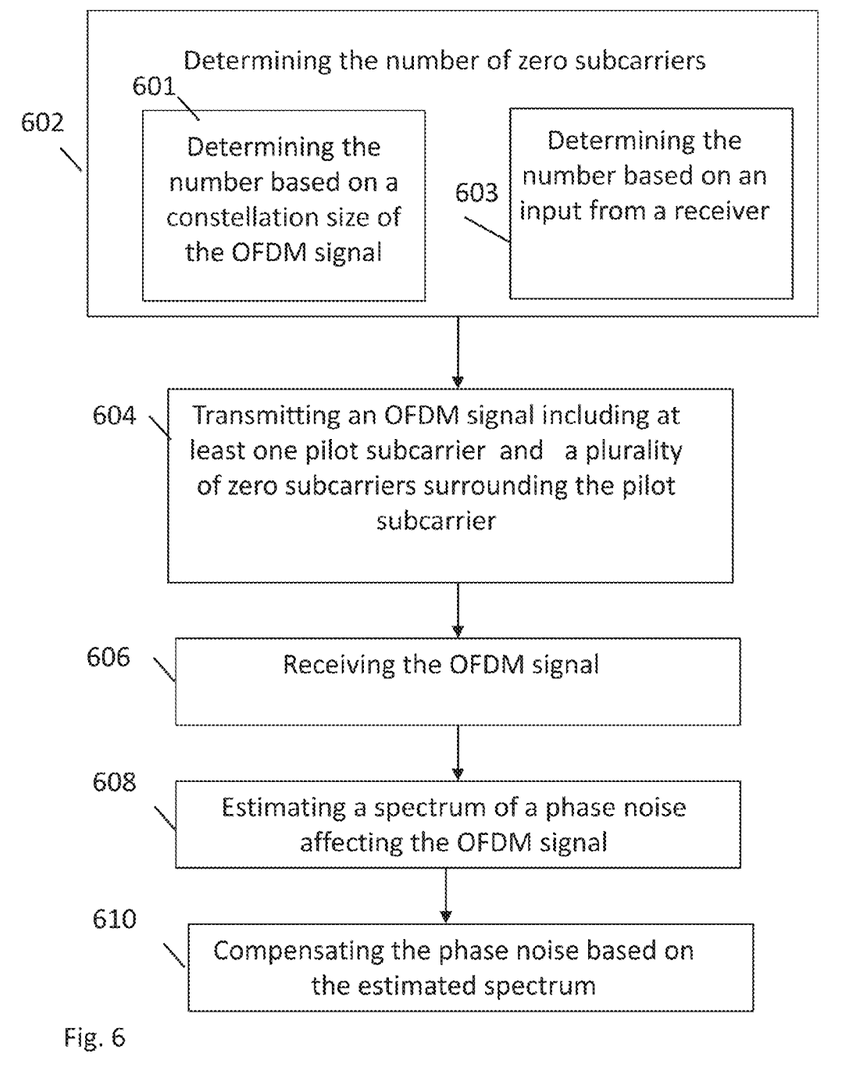
FIG. 6 is a schematic flow chart illustration of a method of communicating a wireless communication orthogonal-frequency-division-multiplexing signal, in accordance with some demonstrative embodiments.

Reference is made to FIG. 6, which schematically illustrates a method of communicating a wireless orthogonal-frequency-division-multiplexing (OFDM) signal, in accordance with some demonstrative embodiments. In some embodiments, one or more of the operations of the method of FIG. 6 may be performed by any suitable wireless communication system, e.g., system 100 (FIG. 1); wireless communication device, e.g., device 102 and/or device 104 (FIG. 1); and/or wireless communication unit, e.g., receiver 112 (FIG. 1), transmitter 105 (FIG. 1), receiver 312 (FIG. 3) and/or receiver 412 (FIG. 4).

As indicated at block 604, the method may include transmitting an OFDM signal including a plurality of data subcarriers carrying data, at least one pilot subcarrier carrying a reference, predefined, value, and a plurality of zero subcarriers, carrying a zero value, surrounding the pilot subcarrier and separating between the pilot subcarrier and the data subcarriers. For example, transmitter 105 (FIG. 1) may transmit signal 113 (FIG. 1) corresponding to structure 201 (FIG. 2A), e.g., as described above.

As indicated at block 602, the method may include determining the number of the zero subcarriers. For example, transmitter 105 may determine a number of ten zero subcarriers, e.g., as described above.

As indicated at block 601, determining the even number of zero subcarriers may include determining the number of the zero subcarriers based on an input from a receiver of the OFDM signal. For example, transmitter 105 may determine the number of zero subcarriers based on an input from receiver 112 (FIG. 1), e.g., as described above.

As indicated at block 603, determining the number of zero subcarriers may include determining the number of the zero subcarriers based on a constellation size of the OFDM signal. For example, transmitter 105 may determine a different number of zero subcarriers for different constellation sizes of signal 113, e.g., QPSK, 16 QAM, 64 QAM, e.g., as described above.

As indicated at block 606, the method may include receiving the OFDM For example, receiver 112 (FIG. 1) may receive signal 113 (FIG. 1) having structure 201 (FIG. 2A), e.g., as described above.

As indicated at block 608, the method may include estimating a spectrum of a phase noise affecting the OFDM signal, based on the pilot subcarrier and two or more of the zero subcarriers. For example, estimator 132 (FIG. 1) may estimate the spectrum of a phase noise affecting signal 113 (FIG. 1), based on pilot subcarrier 202 (FIG. 2A) and the plurality of zero subcarriers 205 (FIG. 2B) surrounding pilot subcarrier 202 (FIG. 2A), e.g., as described above.

As indicated at block 610, the method may include compensating the phase noise based on the estimated spectrum. For example, compensator 132 (FIG. 1) may compensate a phase noise of signal 113 (FIG. 1) based on the estimated spectrum of the phase noise of signal 113 (FIG. 1), e.g., as described above.

Figure 7:
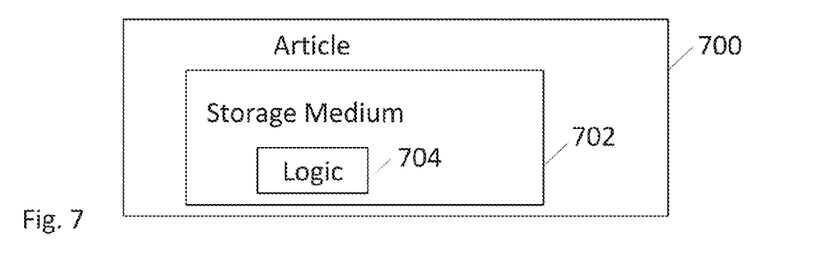
FIG. 7 is a schematic illustration of an article of manufacture, in accordance with some demonstrative embodiments.

Reference is made to FIG. 7, which schematically illustrates an article of manufacture 700, in accordance with some demonstrative embodiments. Article 700 may include non-transitory machine-readable storage medium 702 to store logic 704, which may be used, for example, to perform at least part of the functionality of transmitter 105 (FIG. 1), receiver 112 (FIG. 1) and/or to perform one or more operations of the method of FIG. 6. The phrase "non-transitory machine-readable medium" is directed to include all computer-readable media, with the sole exception being a transitory propagating signal.

In some demonstrative embodiments, article 700 and/or machine-readable storage medium 702 may include one or more types of computer-readable storage media capable of storing data, including volatile memory, non-volatile memory, removable or non-removable memory, erasable or non-erasable memory, writeable or re-writeable memory, and the like. For example, machine-readable storage medium 702 may include, RAM, DRAM, Double-Data-Rate DRAM (DDR-DRAM), SDRAM, static RAM (SRAM), ROM, programmable ROM (PROM), erasable programmable ROM (EPROM), electrically erasable programmable ROM (EEPROM), Compact Disk ROM (CD-ROM), Compact Disk Recordable (CD-R), Compact Disk Rewriteable (CD-RW), flash memory (e.g., NOR or NAND flash memory), content addressable memory (CAM), polymer memory, phase-change memory, ferroelectric memory, silicon-oxide-nitride-oxide-silicon (SONOS) memory, a disk, a floppy disk, a hard drive, an optical disk, a magnetic disk, a card, a magnetic card, an optical card, a tape, a cassette, and the like. The computer-readable storage media may include any suitable media involved with downloading or transferring a computer program from a remote computer to a requesting computer carried by data signals embodied in a carrier wave or other propagation medium through a communication link, e.g., a modem, radio or network connection.

In some demonstrative embodiments, logic 704 may include instructions, data, and/or code, which, if executed by a machine, may cause the machine to perform a method, process and/or operations as described herein. The machine may include, for example, any suitable processing platform, computing platform, computing device, processing device, computing system, processing system, computer, processor, or the like, and may be implemented using any suitable combination of hardware, software, firmware, and the like.

In some demonstrative embodiments, logic 704 may include, or may be implemented as, software, a software module, an application, a program, a subroutine, instructions, an instruction set, computing code, words, values, symbols, and the like. The instructions may include any suitable type of code, such as source code, compiled code, interpreted code, executable code, static code, dynamic code, and the like. The instructions may be implemented according to a predefined computer language, manner or syntax, for instructing a processor to perform a certain function. The instructions may be implemented using any suitable high-level, low-level, object-oriented, visual, compiled and/or interpreted programming language, such as C, C++, Java, BASIC, Matlab, Pascal, Visual BASIC, assembly language, machine code, and the like.

Functions, operations, components and/or features described herein with reference to one or more embodiments, may be combined with, or may be utilized in combination with, one or more other functions, operations, components and/or features described herein with reference to one or more other embodiments, or vice versa.

While certain features of the invention have been illustrated and described herein, many modifications, substitutions, changes, and equivalents may occur to those Skilled in the art. It is, therefore, to be understood that the appended claims are intended to cover all such modifications and changes as fall within the true spirit attic invention.

What is claimed is:

1. A wireless transmitter comprising:
   a Radio Frequency (RF) module configured to transmit a wireless communication orthogonal-frequency-division-multiplexing (OFDM) signal including a plurality of data subcarriers carrying data; and
   a pilot inserter configured to insert into said OFDM signal at least one pilot subcarrier, and a plurality of zero subcarriers surrounding said pilot subcarrier and separating said pilot subcarrier from said data subcarriers, said pilot inserter to determine a number of said plurality of zero subcarriers based on at least one attribute selected from the group consisting of a constellation size of said OFDM signal, and a condition of a channel, over which said OFDM signal is to be transmitted.

2. The wireless transmitter of claim 1, wherein said plurality of zero subcarriers includes an even number of subcarriers symmetrically surrounding said pilot subcarrier, such that the same number of zero subcarriers are located on each side of said pilot subcarrier between said pilot subcarrier and said data subcarriers.

3. The wireless transmitter of claim 1, wherein said pilot inserter is to determine the number of said plurality of zero subcarriers based on an input from a receiver of said OFDM signal.

4. The wireless transmitter of claim 1, wherein said pilot inserter is to determine the number of said plurality of zero subcarriers based on the constellation size of said OFDM signal.

5. The wireless transmitter of claim 1, wherein said pilot inserter is to determine the number of said plurality of zero subcarriers based on the condition of the channel.

6. The wireless transmitter of claim 1, wherein a power of said pilot subcarrier is greater than a power of a data subcarrier of said data subcarriers.

7. The wireless transmitter of claim 6, wherein a power difference between the power of said pilot subcarrier and the power of said data subcarrier is based on a number of said zero subcarriers.

8. A device comprising a wireless receiver, the wireless receiver comprising:
   a Radio Frequency (RF) module configured to receive a wireless communication orthogonal-frequency-division-multiplexing (OFDM) signal including a plurality of data subcarriers carrying data, at least one pilot subcarrier, and a plurality of zero subcarriers surrounding said pilot subcarrier and separating said pilot subcarrier from said data subcarriers; and
   a phase noise estimator configured to estimate a spectrum of a phase noise affecting said OFDM signal based on said pilot subcarrier and two or more of said plurality of zero subcarriers.

9. The device of claim 8 comprising a phase noise compensator to compensate said phase noise based on said estimated spectrum.

10. The device of claim 9, wherein said phase noise compensator is configured to compensate said phase noise in a time domain by de-rotating a phase of said OFDM signal based on the estimated spectrum of the phase noise.

11. The device of claim 9, wherein said phase noise compensator is to compensate said phase noise in a frequency domain.

12. The device of claim 8 comprising a wireless transmitter to transmit to a sender of said OFDM signal an indication of a number of said plurality of zero subcarriers to be included in a subsequent OFDM signal to be transmitted by said sender.

13. The device of claim 8, wherein said phase noise estimator is to estimate said phase noise spectrum based on all of said plurality of zero subcarriers.

14. The device of claim 8, wherein said plurality of zero subcarriers include a first number of subcarriers, and wherein said phase noise estimator is to estimate said phase noise spectrum based on a subset of said zero subcarriers including a second number, which is lesser than said first number, of said zero subcarriers.

15. The device of claim 14, wherein said phase noise estimator is to select the second number of zero subcarriers to be used for estimating said phase noise spectrum based on a constellation size of said OFDM signal.

16. The device of claim 14, wherein said phase noise estimator is to select the second number of zero subcarriers to be used for estimating said phase noise spectrum based on at least one criterion relating to a condition of a channel over which said OFDM signal is received.

17. The device of claim 16, wherein said phase noise estimator is to reduce said second number of zero subcarriers in response to degradation in the condition of said channel.

18. A system comprising:
   at least one wireless communication device comprising:
      at least one wireless communication antenna; and
      a Radio Frequency (RF) module configured to transmit via said antenna a wireless communication orthogonal-frequency-division-multiplexing (OFDM) signal including a plurality of data subcarriers carrying data; and a pilot inserter configured to insert into said OFDM signal at least one pilot subcarrier, and a plurality of zero subcarriers surrounding said pilot subcarrier and separating said pilot subcarrier from said data subcarriers, said pilot inserter to determine a number of said plurality of zero subcarriers based on at least one attribute selected from the group consisting of a constellation size of said OFDM signal, and a condition of a channel, over which said OFDM signal is to be transmitted.

19. The system of claim 18, wherein said pilot inserter is to determine the number of said plurality of zero subcarriers based on an input from a receiver of said OFDM signal.

20. The system of claim 18, wherein a power of said pilot subcarrier is greater than a power of a data subcarrier of said data subcarriers.

21. A system of wireless communication comprising a wireless receiver, the wireless receiver comprising:
a Radio Frequency (RF) module configured to receive a wireless communication orthogonal-frequency-division-multiplexing (OFDM) signal including a plurality of data subcarriers carrying data, at least one pilot subcarrier, and a plurality of zero subcarriers surrounding said pilot subcarrier and separating said pilot subcarrier from said data subcarriers; and
a phase noise estimator configured to estimate a spectrum of a phase noise affecting said OFDM signal based on said pilot subcarrier and two or more of said plurality of zero subcarriers.

22. The system of claim 21, comprising a wireless transmitter to transmit to a sender of said OFDM signal an indication of a number of said plurality of zero subcarriers to be included in a subsequent OFDM signal to be transmitted by said sender.

23. A method comprising:
transmitting a wireless communication orthogonal-frequency-division-multiplexing (OFDM) signal including a plurality of data subcarriers carrying data;
inserting into said OFDM signal at least one pilot subcarrier, and a plurality of zero subcarriers surrounding said pilot subcarrier and separating said pilot subcarrier from said data subcarriers; and
determining a number of said plurality of zero subcarriers based on at least one attribute selected from the group consisting of a constellation size of said OFDM signal and a condition of a channel, over which said OFDM signal is to be transmitted.

24. The method of claim 23 comprising:
determining the number of said plurality of zero subcarriers based on an input from a receiver of said OFDM signal.

25. A method comprising:
receiving a wireless communication orthogonal-frequency-division-multiplexing (OFDM) signal including a plurality of data subcarriers carrying data, at least one pilot subcarrier, and a plurality of zero subcarriers surrounding said pilot subcarrier and separating said pilot subcarrier from said data subcarriers;
estimating a spectrum of a phase noise affecting said OFDM signal based on said pilot subcarrier and two or more of said plurality of zero subcarriers; and
compensating said phase noise based on said estimated spectrum.

26. The method of claim 25, wherein a power of said pilot subcarrier is greater than a power of a data subcarrier of said data subcarriers.

27. A product including a non-transitory storage medium having stored thereon instructions that, when executed by a machine, result in:
transmitting a wireless communication orthogonal-frequency-division-multiplexing (OFDM) signal including a plurality of data subcarriers carrying data;
inserting into said OFDM signal at least one pilot subcarrier, and a plurality of zero subcarriers surrounding said pilot subcarrier and separating said pilot subcarrier from said data subcarriers; and
determining a number of said plurality of zero subcarriers based on at least one attribute selected from the group consisting of a constellation size of said OFDM signal and a condition of a channel, over which said OFDM signal is to be transmitted.

28. The product of claim 27, wherein the instructions result in determining a number of said plurality of zero subcarriers based on an input from a receiver of said OFDM signal.

29. A product including a non-transitory storage medium having stored thereon instructions that, when executed by a machine, result in:
receiving a wireless communication orthogonal-frequency-division-multiplexing (OFDM) signal including a plurality of data subcarriers carrying data, at least one pilot subcarrier, and a plurality of zero subcarriers surrounding said pilot subcarrier and separating said pilot subcarrier from said data subcarriers; and
estimating a spectrum of a phase noise affecting said OFDM signal based on said pilot subcarrier and two or more of said plurality of zero subcarriers, and compensating said phase noise based on said estimated spectrum.

30. The product of claim 29, wherein said plurality of zero subcarriers include a first number of subcarriers, and wherein estimating said phase noise spectrum comprises estimating said phase noise spectrum based on a selected subset of said zero subcarriers including a second number, which is lesser than said first number, of said zero subcarriers.

* * * * *